United States Patent
Wang et al.

(10) Patent No.: US 9,622,132 B2
(45) Date of Patent: Apr. 11, 2017

(54) SWITCHING BETWEEN CELLULAR AND LICENSE-EXEMPT (SHARED) BANDS

(75) Inventors: Haifeng Wang, Shanghai (CN); Jing Xu, Shanghai (CN); Ting Zhou, Shanghai (CN); Zhenhong Li, Shanghai (CN); Wei Zou, Shanghai (CN); Jinling Du, Shanghai (CN)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 495 days.

(21) Appl. No.: 14/235,241

(22) PCT Filed: Jul. 28, 2011

(86) PCT No.: PCT/CN2011/077730
§ 371 (c)(1),
(2), (4) Date: Apr. 8, 2014

(87) PCT Pub. No.: WO2013/013412
PCT Pub. Date: Jan. 31, 2013

(65) Prior Publication Data
US 2014/0308954 A1    Oct. 16, 2014

(51) Int. Cl.
*H04W 36/00* (2009.01)
*H04W 36/16* (2009.01)
*H04W 36/06* (2009.01)
*H04W 36/14* (2009.01)
*H04W 76/02* (2009.01)

(52) U.S. Cl.
CPC ..... *H04W 36/165* (2013.01); *H04W 36/0055* (2013.01); *H04W 36/06* (2013.01); *H04W 36/14* (2013.01); *H04W 76/023* (2013.01)

(58) Field of Classification Search
None
See application file for complete search history.

(56) References Cited

U.S. PATENT DOCUMENTS

| | | | |
|---|---|---|---|
| 2007/0213046 A1* | 9/2007 | Li | H04W 40/244 455/425 |
| 2009/0325625 A1 | 12/2009 | Hugl et al. | |
| 2010/0261469 A1 | 10/2010 | Ribeiro et al. | |
| 2010/0279672 A1 | 11/2010 | Koskela et al. | |
| (Continued) | | | |

*Primary Examiner* — Suhail Khan
(74) *Attorney, Agent, or Firm* — Oblon, McClelland, Maier & Neustadt, L.L.P.

(57) ABSTRACT

A method and an apparatus for switching D2D data communications between a licensed and a license-exempt band are disclosed. A D2D device receives from a cellular network a pre-switch notification to prepare for a switch of its D2D communications, and in response adopts a temporary strategy for conducting its D2D transmissions prior to the switch. After the switch the D2D device discontinues the temporary strategy. In one embodiment the temporary strategy and its duration are indicated in the pre-switch notification. Two example temporary strategies are presented: 'no-new-data' where new data transmissions are suspended and data re-transmissions are sent with high reliability; and 'no-feedback' where new data is sent with high reliability and data re-transmissions are suspended. Different embodiments have the cellular network access node or D2D device contending for the radio resource in the license-exempt frequency band.

16 Claims, 6 Drawing Sheets (56) References Cited

U.S. PATENT DOCUMENTS

| | | | |
|---|---|---|---|
| 2012/0077510 A1* | 3/2012 | Chen | H04W 28/26 455/452.1 |
| 2013/0005377 A1* | 1/2013 | Wang | H04W 72/0406 455/509 |
| 2013/0012221 A1* | 1/2013 | Zou | H04W 72/10 455/452.1 |
| 2013/0150051 A1* | 6/2013 | Van Phan | H04W 12/04 455/437 |

* cited by examiner

SWITCHING BETWEEN CELLULAR AND LICENSE-EXEMPT (SHARED) BANDS

TECHNICAL FIELD

The exemplary and non-limiting embodiments of this invention relate generally to wireless communication systems, methods, devices and computer programs and, more specifically, relate to procedures and signaling for switching data communications for a user equipment between licensed and license-exempt frequency bands (for example, between cellular and WLAN frequencies).

BACKGROUND

The following abbreviations may be found in the specification and/or the drawing figures, and are defined as follows:
  3GPP third generation partnership project
  ACK acknowledgement
  D2D device-to-device
  DCF distributed coordination function
  eNodeB base station of an LTE system (evolved NodeB)
  E-UTRAN evolved universal terrestrial radio access network
  HARQ hybrid automatic repeat request
  HeNB home eNodeB (sometimes termed a femto cell)
  HF hyper-frame number
  IEEE Institute of Electrical and Electronics Engineers
  ISM industrial scientific medical
  LTE long term evolution (evolved UTRAN)
  MAC medium access control
  MCS modulation and coding scheme
  NACK negative acknowledgement
  PCell primary cell
  PCF point coordination function
  PDCP packet data convergence protocol
  RAT radio access technology
  RLC radio link control
  RRC radio resource control
  SCell second cell
  SDU service data unit
  SN serial number
  STA station
  TB transport block
  UE user equipment
  WLAN wireless local area network The volume of wireless data being communicated over the scarce radio spectrum licensed to the various cellular carriers has grown dramatically over the past several years as the public has increasingly adopted various smartphone technologies. As a consequence much research has gone into utilizing various radio spectrum which has not been subject to licensed use in the past. Significant examples of such license-exempt spectrum is the ISM band which has long been used for WLAN, Bluetooth and Bigbee, and also television white spaces which were once reserved for television broadcast but have not been fully exploited as digital television signals have increasingly been carried over cable. Such license-exempt frequency bands are also termed shared bands or shared spectrum.

Some of this recent research is directed to the model in which the user camped on a cellular band has some of its data traffic 'offloaded' to the license-exempt band. However the offloading is to occur, since the license-exempt band is subject to use by other users not under control of the cellular user's cellular base station (and perhaps not even known to that base station), the cellular user's utilization of the license-exempt radio resources must follow the same protocol which those non-cellular users also follow. This helps assure that the available license-exempt bandwidth is fairly distributed among the various users.

Direct D2D communication is one emerging technique which can relieve traffic on the licensed bands. In D2D communications, the user devices communicate directly with one another without their transmissions having to first pass through the cellular network. There are varied ways to implement this emerging technology but for the case in which the D2D communication is on the license-exempt frequencies it represents traffic which could have but didn't need to go over the licensed cellular spectrum. So for example a cellular UE which wants to engage in D2D communications can operate simultaneously as a WLAN non-AP STA and utilize IEEE 802.11 protocols to contend with other users for radio resources (time and frequency slots or channels) on the license exempt band.

In order to assure fairness among various users as mentioned above, most shared band utilization protocols have some time limits on usage before a device needs to contend again with others for a channel. This is to prevent one user device which wins a channel contention from occupying the license-exempt channel indefinitely. The above-mentioned cellular UE seeking to conduct D2D communications on the shared band is also subject to those time limits. For example, in WLAN (the IEEE 802.11 family of specifications) the channels are in the ISM band and so are license-exempt, so it is reasonable that noise and interference will always be present. Given these generally poor channel conditions (relative to cellular), WLAN transmissions are typically limited to a few dozen milliseconds.

Figure 1:
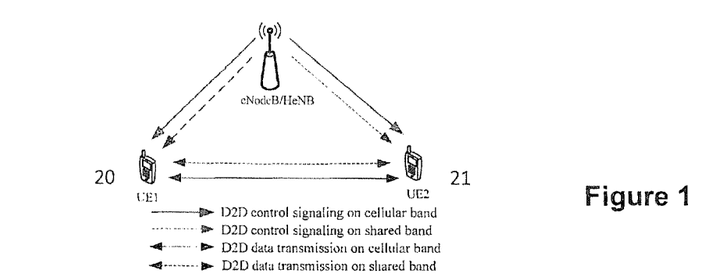
FIG. 1 is a schematic diagram showing one D2D communication scenario in which a cellular access node uses control signaling on licensed or license-exempt spectrum to coordinate D2D communications between two UEs on either licensed or license-exempt spectrum, and is an environment in which embodiments of the invention may be advantageously practiced.

The examples below use LTE as the cellular system using licensed spectrum and WLAN as the system using license-exempt spectrum, but these are exemplary only and not limiting to the broader teachings herein. FIG. 1 illustrates an eNodeB 22 (which may be implemented as a HeNB) exercising centralized control over D2D communications between a first UE1 20 and a second UE2 21. In this arrangement the eNodeB 22 informs control signaling either on the cellular band 40 or on the shared band 50, and the UEs 20, 21 transmit data directly either on the cellular band 41 or on the shared band 51. The first UE1 20 can contend and occupy the shared bands (for example, the first UE1 20 pretends to be a virtual WLAN device to contend the shared band). Whether on the shared band or on the cellular band, the D2D transmission 41, 51 would use the air interface of the cellular system (e.g., scheduling protocol, frame arrangement, HARQ processes, etc.).

A problem arises in that the time limits for usage of the license-exempt band may not allow for sufficient amount of data to be transferred given the contention protocol that must be negotiated to use that band. The inventors anticipate that the situation may routinely arise where some data is transferred on the license-exempt band, only to have further portions of the same substantive communication (for example a unicast or multicast transmission) having to be transmitted over the licensed cellular band, and possibly back and forth as the involved device(s) alternately win and lose contention for a channel on the license-exempt band. As will be seen, contention protocols for WLAN and other license-exempt systems are not optimized for splitting a coherent data transmission back and forth between licensed and license-exempt band. Neither are the cellular systems optimized for such back and forth frequency switches.

Specifically, while the cellular devices seeking to use the license-exempt band for traffic need to observe the WLAN contention rules to obtain a shared band channel, it is inevitable that they will sometimes need to switch back to the cellular band to transmit at least some of their data. In order to use the shared band as much as possible such frequency switches are likely to occur routinely. If the latency to perform such a frequency switch is too large this will limit how much the cellular devices will be able to utilize the shared band.

In the conventional cellular protocols for handover or for activating a component carrier (SCell) on the license-exempt spectrum, there is the additional problem of how to guarantee no loss of data. To fully exploit a transmission opportunity on the license-exempt band for sending data there will be no resources left for the receiving UE2 21 to send its HARQ reply for the last of the scheduled data, potentially leading to the sending UE1 20 missing a necessary re-transmission to the receiving UE2 21. If one solves this by having the data receiver UE2 21 feeding back its HARQ status indication to the sending UE1 20 via RRC or RLC signaling to guarantee the HARQ delivery, the latency issue is not resolved.

Exemplary embodiments of the invention detailed below address this frequency-switching problem.

SUMMARY

The foregoing and other problems are overcome, and other advantages are realized, by the use of the exemplary embodiments of this invention.

In a first exemplary embodiment of the invention there is a method comprising: in response to receiving a pre-switch notification to prepare for a switch between a licensed frequency band and a license-exempt frequency band, adopting a temporary strategy for conducting data-related transmissions prior to the switch; and after the switch, discontinuing the temporary strategy.

In a second exemplary embodiment of the invention there is an apparatus comprising a processing system comprising at least one processor and a memory storing a set of computer instructions. In this embodiment the processing system is arranged to: in response to receiving a pre-switch notification to prepare for a switch between a licensed frequency band and a license-exempt frequency band, adopt a temporary strategy for conducting data-related transmissions prior to the switch; and after the switch, discontinue the temporary strategy.

In a third exemplary embodiment of the invention there is a computer readable memory storing a set of instructions which are executable by one or more processors. In this embodiment the instructions comprise: code for adopting a temporary strategy for conducting data-related transmissions prior to a switch between a licensed frequency band and a license-exempt frequency band in response to receiving a pre-switch notification to prepare for the switch; and code for discontinuing the temporary strategy after the switch.

DETAILED DESCRIPTION

The exemplary embodiments presented herein provide a new mechanism to guarantee a fast frequency switch between cellular bands and shared bands without data loss. Before detailing these embodiments, the exemplary LTE and WLAN systems are explored to better understand how the exemplary embodiments presented afterwards more efficiently meet the data needs of the involved devices.

There are few specified solutions for switching between cellular bands and shared bands for the same source UE 20 and target UE 21 in D2D communications. One follows the conventional intra-cell cellular handover way, the other follows establishing an SCell on the shared band.

Figure 2A:
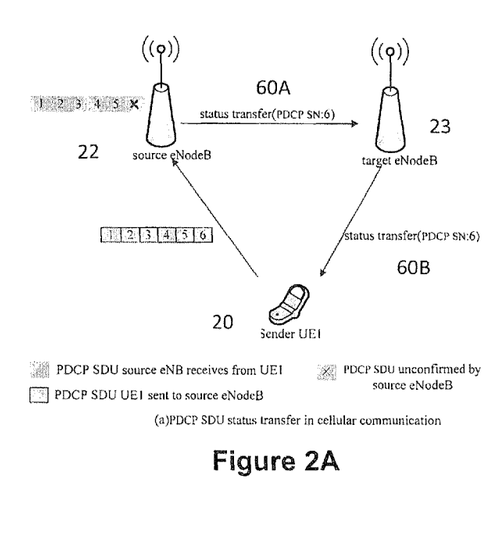
FIG. 2A illustrates a conventional PDCP status transfer from a source to a target eNodeB in the LTE system during handover of a UE.

In cellular systems, the data traffic transmission between UEs is conventionally relayed via the serving eNodeB 22 (the source eNodeB). The handover as shown at FIG. 2A means that the serving eNodeB 20 needs to change to the other eNodeB 23 (the target eNodeB). Conventionally the source eNodeB 22 makes the handover decision when its cellular link quality with the UE 20 is lower than some pre-defined threshold over some pre-defined duration. Since the link is already poor, in order to meet the link quality requirements the source eNodeB 22 has to initiate the handover immediately. Meanwhile, in order to avoid data loss the source eNodeB 22 informs the status transfer 60A (the PDCP SN) to the target eNodeB 23. The PDCP SN corresponds to the forwarded packet which is to be expected (to or from the UE 20 being handed over), and helps the target eNodeB to inform the UE via RRC signaling 60B of the packets not to be retransmitted. This makes the overall selective (re-)transmission scheme faster during the handover.

Figure 2B:
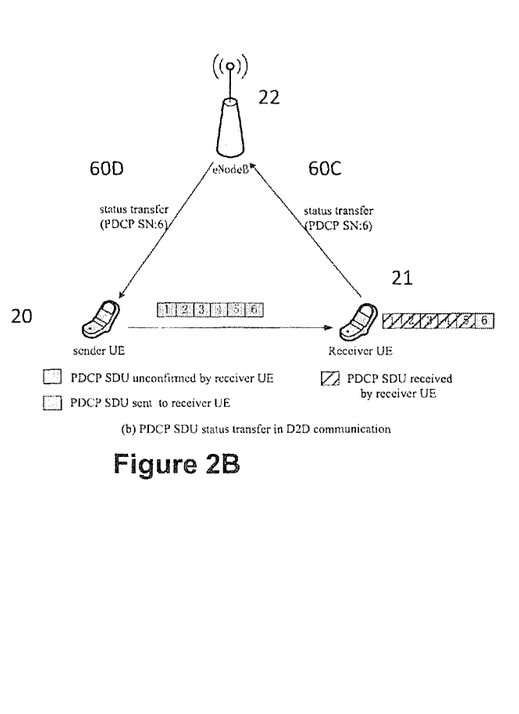
FIG. 2B is a PDCP status transfer similar to FIG. 2A but adapted for the case in which two UEs are conducting D2D communications in a cellular frequency band.

To adapt this in a straightforward manner to a 'handover' from the cellular to the license-exempt band as illustrated at FIG. 2B, to avoid data loss of D2D communication the data-receiving UE 21 informs the date-sending UE 20 which PDCP SN is expected to be (re-)transmitted at message 60C. This PDCP SN shall be delivered as feedback to the data-sending UE 20 during the cellular RRC signaling shown at 60D via forwarding by the eNodeB 22. The latency for this in the LTE system is ten milliseconds.

Figure 3:
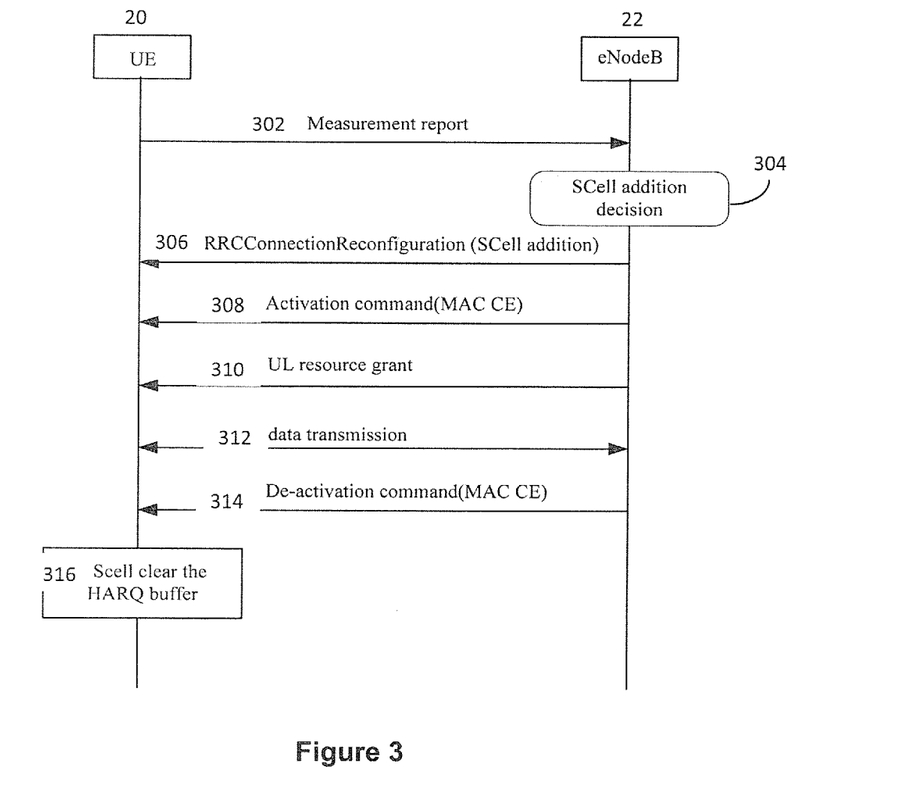
FIG. 3 is a signaling diagram illustrating conventional activation and de-activation of a SCell in the LTE system.

Another conventional way to switch to a license-exempt band if to employ a carrier aggregation mechanism of activating a SCell on the shared band, In carrier aggregation the whole spectrum available is parsed into various component carriers, and each UE has one PCell and possibly activated SCells. Once option is to have an SCell be on the shared band, but as above to actually use it either the eNodeB or the UE must contend for a channel using the prevailing channel contention protocol. As is conventional the PCell must be in the cellular band while the SCell would be in the shared band in which some time limits apply for the data/channel utilization. In this case for the D2D communications the shared band shall be activated and de-activated according to the shared band utilization time etiquette or protocol. FIG. 3 briefly summarizes this procedure for SCell activation and deactivation.

At FIG. 3 the UE 20 sends at 302 on the PCell its measurement reports to the eNodeB 22. The eNodeB 20 makes its SCell addition decision, then the eNodeB sends a 'RRC_Connection_Reconfiguration' decision at 304 to add an SCell and then sends at 306 its 'activation command' to the UE 20 via MAC signaling. In response the UE 20 configures one independent HARQ entity (process) for the newly activated SCell. The eNodeB 22 sends an uplink grant 310 for the SCell which schedules the UE 20 for uplink radio resources on the SCell to send its data. Data transmission between the UE 20 and the eNodeB 22 can then occur at 312 on both the PCell and the SCell. If the eNodeB 22 no longer needs the SCell for this UE 20, it sends a de-activation command 314 to the UE 20 via MAC signaling after which the UE 20 clears out its SCell. HARQ buffer at 316.

To employ the conventional SCell activation/de-activation mechanism of FIG. 3 for the case of offloading D2D communications onto a license-exempt SCell, anytime there is a switch between licensed/cellular and license-exempt/shared frequency bands would mean that the transport blocks in the HARQ transmission buffer in the previous band are cleared. This includes those TBs for which there has not yet been received any HARQ feedback (acknowledgement/negative acknowledgement) in time. This may lead to data loss or redundancy because the data-sending UE 20 does not know which TBs are received by the data-receiving UE 21 and which are not during the process of switching between cellular and shared bands. As with the handover procedure above the data-receiving UE 21 can trigger an RLC status report (60C, 60D at FIG. 2B) on the cellular band to inform the data-sending UE 20 which packets are expected to be (re-)transmitted. But while modifying the license-exempt SCell activation/de-activation procedure in this way might guarantee no data loss, it also imposes ten milliseconds of latency time as well (in LTE). For data transmission on the shared band, the data transmission time maybe only be allowed for dozens of milliseconds.

From the above it is clear that neither the handover nor SCell activation/de-activation techniques can utilize the shared band enough to be effective if data loss is to be prevented. Broadly summarized, in the exemplary embodiments of the invention below the cellular access node (eNodeB 22) sends to the UEs 20, 21 a pre-switch notification informing them to prepare for a switch between a licensed frequency band and a license-exempt frequency band. In response to receiving this pre-switch notification the UEs (or at least one of them, say for example if the D2D communications are unicast or multicast transmissions from only the first UE 20) adopt a temporary strategy for conducting data-related transmissions prior to the switch. After the switch the UE(s) discontinue the temporary strategy. Thus there are two changes to the way data-related transmissions are handled; the first is when the temporary strategy is adopted and the second is when the temporary strategy is discontinued.

Figure 4:
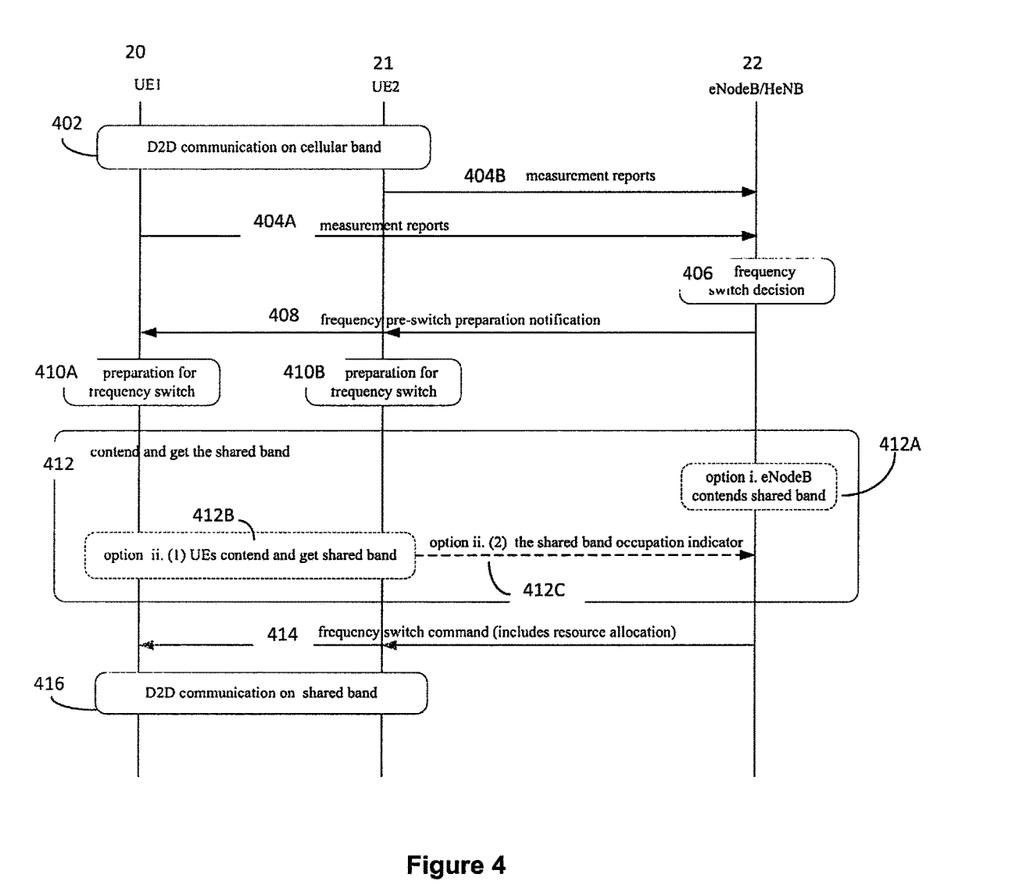
FIG. 4 is a signaling diagram illustrating a procedure for switching data transmissions from a cellular band to a shared band in accordance with one exemplary embodiment of these teachings.
Figure 5:
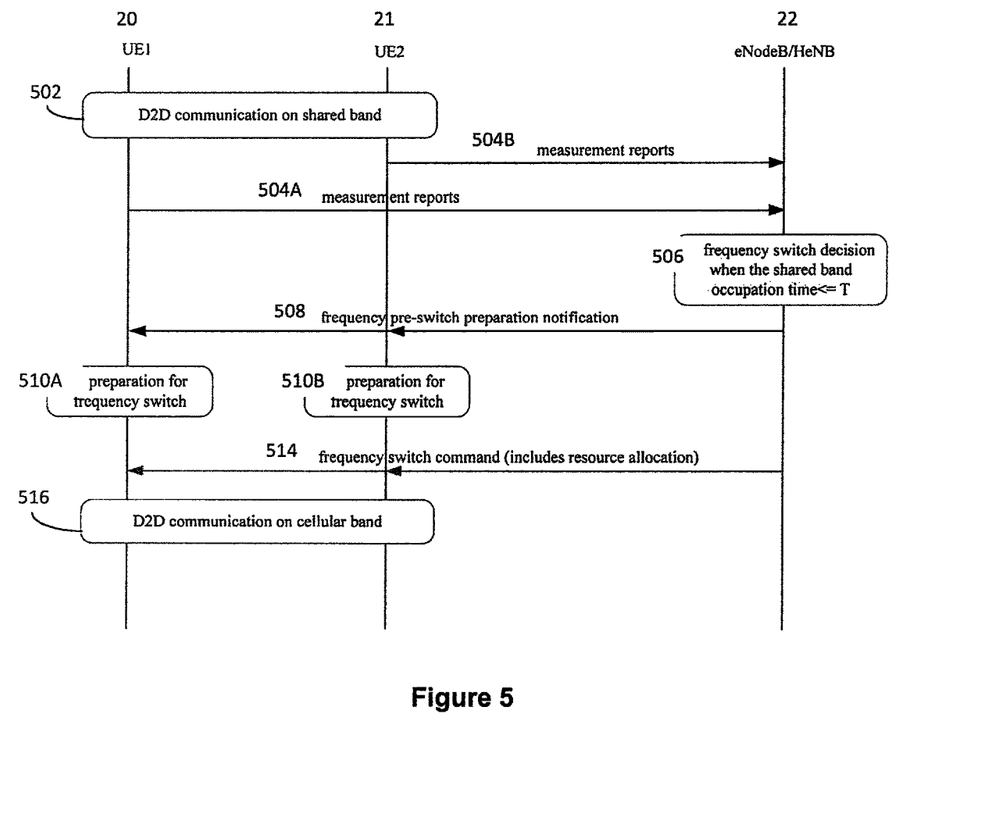
FIG. 5 is a signaling diagram illustrating a procedure for switching data transmissions from a shared band to a cellular band in accordance with one exemplary embodiment of these teachings.

While the examples below at FIGS. 4 and 5 are in the context of there being two strategy options for the temporary strategy, the inventors are not aware of any prior art notification, prior to a frequency switch, in which such a temporary strategy is adopted only to have it discontinued upon the actual switch. Of course there may be more than only two options, but there need not be any options from which a selection is made since the temporary adoption of such a strategy between the pre-switch notification and the switch is novel in itself.

In the exemplary embodiments below this temporary strategy for handling data-related transmissions is the mechanism by which the D2D devices can reduce, as compared to the possibilities discussed with reference to FIGS. 2B and 3, the latency involved in a frequency switch between cellular bands and shared bands without data loss. As applied to the example scenario in which the licensed band is LTE cellular, an exemplary embodiment finds the eNodeB 22 sending a signaling notification in advance of the switch while the system makes the frequency switch preparation for the D2D UEs 20, 21. The notification includes an alternative strategy option and the corresponding duration time to avoid data loss. Once the UEs 20, 21 are switched onto the new frequency, the data-sending UE 20 can go on with its selective data transmission immediately without having to wait for the status report (60C-D of FIG. 2B) originated from the data-receiving UE 21.

There are in the examples below two strategy options for handling the data-related transmissions. It is the eNodeB 22 which makes the selection which it indicates to the UEs 20, 21 in the pre-switch preparation notification. A first option is termed no-new-data-transmission in which the data-sending UE 20 sends no new data transmissions. In this option no new data is sent since the actual switch between the cellular and shared bands may cause any feedback (ACK/NACK) mapped to new data to come too late, after the switch. But the data-sending UE 20 can still send data re-transmissions if there are any to send. Since still there will be no ACK/NACK for that re-transmitted data, the sending UE 20 will send data re-transmissions in a conservative communication mode to better guarantee its proper reception at the receiving UE 21. By example this conservative communication mode may be the lowest available MCS for these data re-transmissions.

A second option is termed no-feedback-transmission, in which the data-sending UE 20 can send new data (if any) but there is no feedback ACK/NACK that the data-sending UE 20 receives from the data-receiving UE 21. In this case, since again there is no ACK/NACK feedback from the data-receiving UE 21, the data-sending UE 20 will transmit its new data in a conservative communication mode such as a lower MCS to better assure the new data transmission is properly received at the data-receiving UE 21.

FIG. 4 is a signaling diagram illustrating a switch of D2D communications from a cellular band to a shared band, whereas FIG. 5 shows a similar switch in reverse. While the procedures described for those figures can be taken individually, the most efficient use of the shared band is seen to arise when switches in both directions take place for the same coherent set of D2D communications (for example, unicast or multicast D2D communication from one UE 20 to another 21). As will be detailed for FIG. 4, in one embodiment the eNodeB can contend for and grab the channel in the shared band and in another embodiment one or both of the UEs 20, 21 can do so. FIGS. 4-5 assume persistent or semi-persistent scheduling on both the cellular and shared bands, but with dynamic scheduling all that needs to be added are the dynamic resource allocations from the eNodeB 22 which would be interposed during the D2D communications.

FIG. 4 begins with the UEs 20, 21 engaging in D2D communications 402 on the cellular band. This is centrally controlled by the eNodeB 22 and the UEs send their measurement reports 404A, 404B periodically to the eNodeB 22. These reports 404A, 404B have measurements for both the cellular and the shared bands. Based on those measurement reports showing that the UEs have a high opportunity to switch to the shared band the eNodeB 22 decides at block 406 to switch from the cellular band to the shared band. In truth this decision 406 is different from a conventional handover decision since the eNodeB 22 makes the switch decision proactively. Instead of attempting to meet wireless channel quality requirements or mitigating its own overload, in this decision 406 the eNodeB 22 chooses to use the free shared band as much as possible.

The eNodeB 22 then sends a frequency pre-switch preparation notification/message 408 to the UEs 20, 21. Sending the frequency pre-switch preparation notification 408 prior to the actual switch allows the UEs 20, 21 (or the eNodeB 22) time to contend for a channel on the shared band without adding latency to the switch. The preparation notification 408 gives a temporary operation strategy and the duration time for it. The duration time may be indicated as a start time and a duration, a start and an end time, or as only a start time which implies the duration for the temporary operation strategy will continue until the switch to the shared band actually occurs. The start/end times may be indicated as frames (for example, system frame number) or other timing regimen particular to the wireless protocol in use. The eNodeB 22 estimates the duration time and selects the temporary operation strategy according to the specific problem and system conditions. As noted above there are two strategies in these examples; no-new-data-transmission and no-feedback-transmission. Since the UEs 20, 21 can prepare for the frequency switch in advance, with the help of the operation strategy the UEs 20, 21 can guarantee the successful transmission of the original data traffic.

Once UE1 20 and UE2 21 receive the preparation notification 408, then they would prepare at blocks 410A-B for the switch according to the notification signaling. If the strategy option is no-new-data-transmission, the UE1 20 shall not transmit any new D2D data during the duration that was indicated in the preparation message 408. If the original D2D data has some error as received by UE2 21, the UE1 20 will retransmit it in a conservative communication mode to guarantee that first data re-transmission is successfully received. As noted above, such a conservative communication mode can be a lower MCS than the original (new) data transmission or lowest MCS available in the example. If the strategy option is no-feedback-transmission (or 'no need to receive feedback'), then during the duration the UE1 20 should transmit any new data in a conservative communication mode such as those noted above and assume the other UE2 21 received it correctly since that other UE2 21 will not be sending an ACK or NACK for it.

Now, while the UE1 20 handles its data-related transmissions according to the temporary operations strategy indicated in the preparation notification 408, either the eNodeB 22 or one or both of the UE 20, 21 can contend for a channel on the shared band at block 412. If at block 412A the eNodeB 22 contends for it then once the eNodeB 22 secures the channel and occupies the shared band it can send a frequency-switch command 414 to the UEs 20, 21 to make the switch from the cellular to the shared band. This command 414 also has a resource allocation for the UEs 20, 21 which is how the eNodeB 22 informs them of which channel on the shared band it won in the contention 412A.

If on the other hand one of the UEs 20, 21 contends at block 412B for a channel on the shared band, then once they get one they send to the eNodeB 22 an indication 412C that they've occupied a certain channel on the shared band. In this case the frequency-switch command 414 is the same. This is because even though the UEs 20, 21 know in advance which channel on the shared band will be used after the switch, the resource allocation in that command 414 sets the UE1 20 as the data-sender and the UE2 21 as the data-receiver. In order to efficiently and reasonably utilize the shared band won in the contention 412, the eNodeB 22 may schedule and assign portions of those shared resources to other cellular UEs for utilization.

Upon receipt of the frequency switch command 414 (or at a frame number or time specified by that command 414) the UEs 20, 21 begin conducting their D2D data transmissions 416 on the shared band. The data-sending UE1 20 can start to transmit new data without regard to the temporary strategy indicated in the preparation notification 408. Unlike a conventional handover, this approach does not to need to wait the status report from the data-receiving UE2 21 for selective re-transmission to assure lossless data, and so the latency for switching is reduced.

FIG. 5 is a signaling diagram illustrating a switch of D2D communications from a shared band to a cellular band and begins with the UEs 20, 21 engaging in D2D communications 502 on the shared band. The measurement reports 504A-B are similar to those 404A-B at FIG. 4, The decision at block 506 by the eNodeB 22 to switch to the cellular band may be based on the eNodeB 22 recognizing that the occupation time on the shared band (according to WLAN for example, or other protocols for shared band usage) is soon to expire. The eNodeB 22 can track this with an internal timer set for some threshold time T. The frequency pre-switch preparation notification 508, the UE preparations at 510A-B, and the frequency switch command 514 are similar to the respective FIG. 4 reference numbers 408, 410A-B and 414 discussed above. But the resource allocation in the frequency switch command 514 allocates resources on the cellular band, and so the D2D communications at 516 continue on those resources in the cellular band after switching from the shared band according to the command 514.

One technical effect of the exemplary embodiments presented above is that the switch between cellular and shared bands can be done for the same pair (or group) of UEs 20, 21 with a reduced latency time and still without data loss. This result arises from two complementary aspects; the notification 408, 508 gives the UEs time to prepare for the switch by closing out all of their already-open HARQ processes for the D2D data, and there is no need to await the receiving UE's status report shown as 60C-D at FIG. 3. As compared to a handover procedure adapted for a frequency switch there is potentially a reduced number of data retransmissions due to using a conservative transmission mode (lower MCS) for new data transmissions or for data re-transmissions during the duration over which the temporary strategy is put into effect. For the FIG. 4 switch from the cellular to the licensed band it may be difficult for the eNodeB 22 to give a highly accurate duration for the temporary strategy in the preparation notification message 408 since at that point contention for the channel on the shared band has not yet been won, but the eNodeB 22 can make an estimate based on the measurement reports 408A-B and past history of similar switches.

Figure 6:
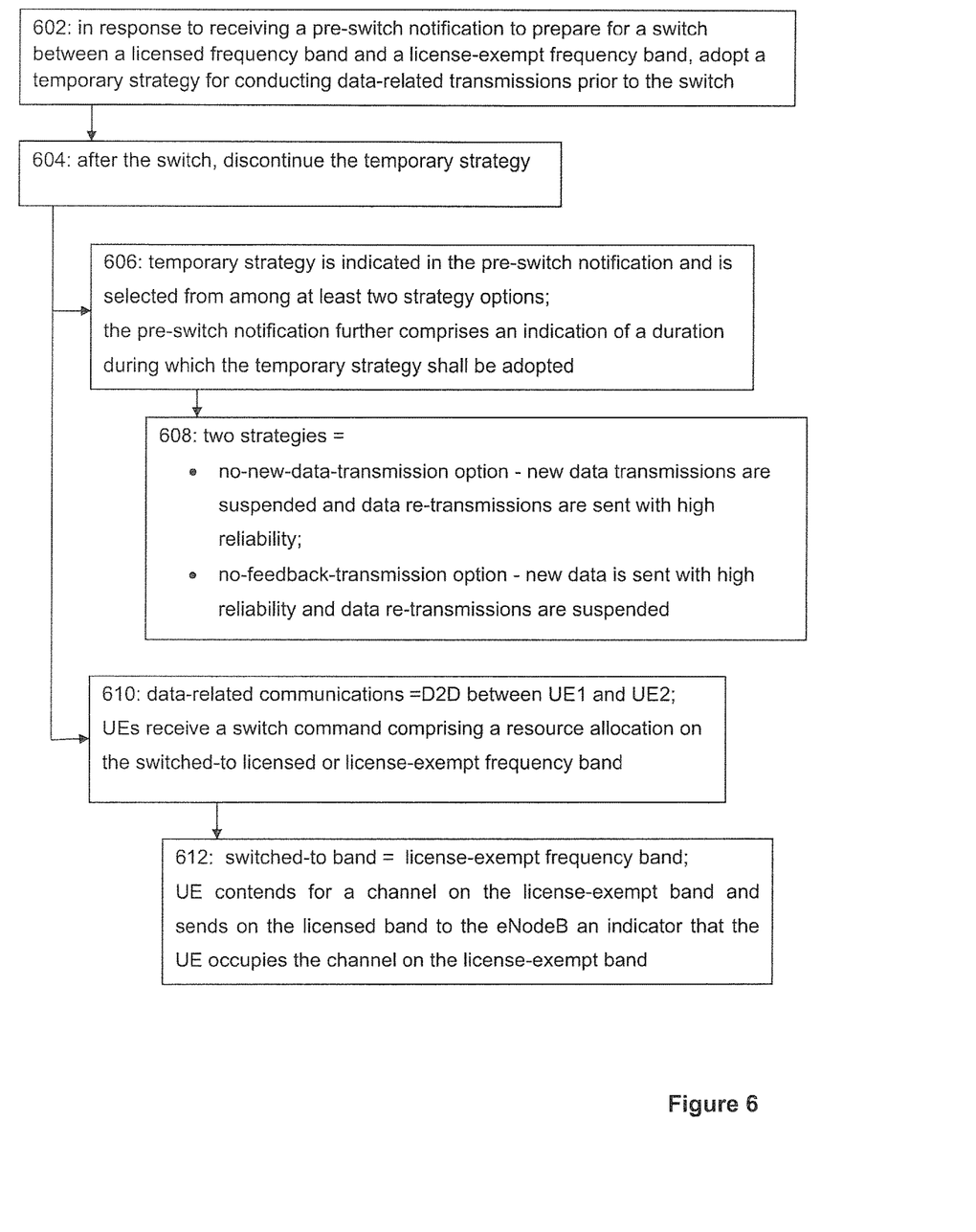
FIG. 6 is a logic flow diagram illustrating the operation of a method, and a result of execution of computer program instructions embodied on a computer readable memory, for switching data transmissions between cellular and shared bands as illustrated at FIGS. 4-5 and according to an exemplary embodiment of these teachings.

FIG. 6 details particular exemplary embodiments of the invention from the perspective of the data-sending UE1 20 (or one or more components thereof). At block 602 of FIG. 6, in response to receiving a pre-switch notification to prepare for a switch between a licensed frequency band and a license-exempt frequency band, the UE1 20 (or apparatus) adopts a temporary strategy for conducting data-related transmissions prior to the switch. And at block 604 the UE1 20 discontinues the temporary strategy after the switch.

Further portions of FIG. 6 are optional and may or may not be combined with one another in various embodiments. Block 606 gives the embodiment in which the eNodeB 22 can choose from multiple different temporary strategies. In this case the temporary strategy is indicated in the pre-switch notification and is selected from among at least two strategy options; and the pre-switch notification further comprises an indication of a duration during which the temporary strategy shall be adopted.

Block 608 gives the two exemplary strategy options. For the ease in which there is data to send during the indicated duration, there is a no-new-data-transmission option in which new data transmissions are suspended and data re-transmissions are sent with high reliability, and a no-feed-back-transmission option in which new data is sent with high reliability and data re-transmissions are suspended. Also in the no-new-data-transmission option the UE1 20 continues sending and receiving acknowledgements for any correctly received data re-transmissions, if in fact the communications are two-way rather than unicast/multicast. It follows then that in the no-feedback-transmission the UE1 20 suspends sending and receiving acknowledgements for any correctly received new data transmissions (for 2-way communications). In the examples above the high reliability of block 608 means the UE1 20 uses a low modulation and coding scheme for the sending, either a) lower than the original data which is being transmitted or b) lower than the last new data that was transmitted or c) the lowest available MCS.

Block 610 details that the data-related communications comprise device-to-device communications between a first UE1 20 and at least one second UE2 21. Block 610 further summarizes that the switch command which the UEs receive comprises a resource allocation of radio resources, and that switching of the data-related transmissions is from a one of the licensed or license-exempt frequency bands to the other of the licensed or license-exempt frequency bands on which lie the allocated radio resources.

And finally block 612 details the embodiment in which the first (or second) UE contends for and wins the channel on the shared band. In this case the switch is from the licensed frequency band to the license-exempt frequency band, the UE contends for a channel on the license-exempt band, and sends on the licensed band to a network access node (the eNodeB if LTE) an indicator that the UE occupies the channel on the license-exempt band.

FIG. 6 is a logic flow diagram which may be considered to illustrate the operation of a method, and a result of execution of a computer program stored in a computer readable memory, and a specific manner in which components of an electronic device are configured to cause that electronic device to operate. The various blocks shown in FIG. 6 may also be considered as a plurality of coupled logic circuit elements constructed to carry out the associated function(s), or specific result of strings of computer program code stored in a memory.

Such blocks and the functions they represent are non-limiting examples, and may be practiced in various components such as integrated circuit chips and modules, and that the exemplary embodiments of this invention may be realized in an apparatus that is embodied as an integrated circuit. The integrated circuit, or circuits, may comprise circuitry (as well as possibly firmware) for embodying at least one or more of a data processor or data processors, a digital signal processor or processors, baseband circuitry and radio frequency circuitry that are configurable so as to operate in accordance with the exemplary embodiments of this invention.

Figure 7:
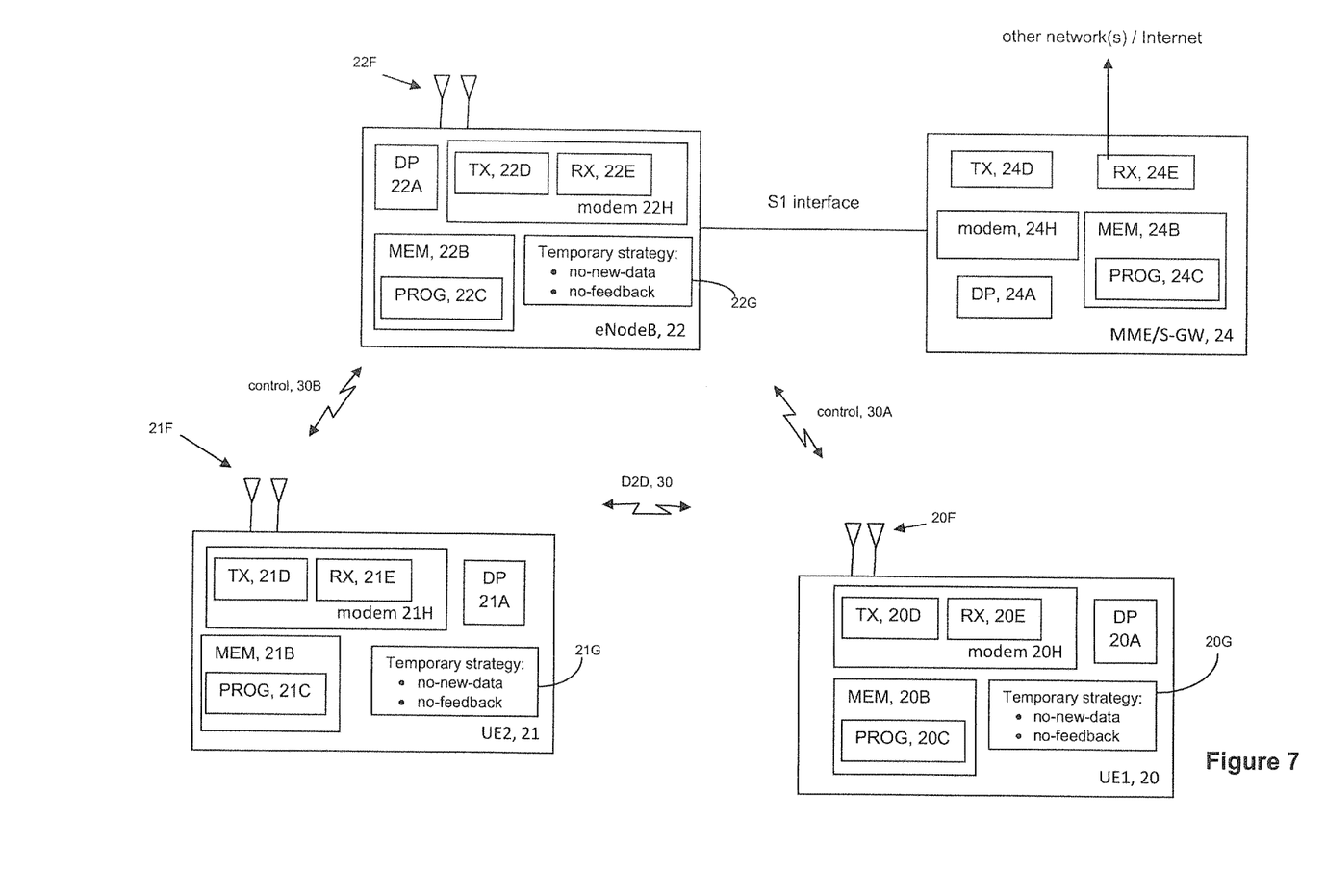
FIG. 7 is a simplified block diagram of the nodes shown at FIGS. 4-5 which are exemplary electronic devices suitable for use in practicing the exemplary embodiments of this invention.

Reference is now made to FIG. 7 for illustrating a simplified block diagram of various electronic devices and apparatus that are suitable for use in practicing the exemplary embodiments of this invention. In FIG. 7 there is a cellular network access node 22 such as an eNodeB with a data and control interface (SI) to a higher network node 24 which is serving the functions of a mobility management entity MME and of a serving gateway S-GW 24. The eNodeB 22 is communicatively coupled to further networks (e.g., a publicly switched telephone network PSTN and/or a data communications network/Internet), via the MME/S-GW 24. The eNodeB 22 is adapted for communication over wireless control links 30A, 30B with two apparatus 20, 21, such as mobile terminals or termed more generally as user devices or UEs.

The first UE1 20 includes processing means such as at least one data processor (DP) 20A, storing means such as at least one computer-readable memory (MEM) 20B storing at least one computer program (PROG) 20C, communicating means such as a transmitter TX 20D and a receiver RX 20E for bidirectional wireless communications with the eNodeB 22 via one or more antennas 20F. There is a modem 20H shown on a RF front end chip with the TX 20D and the RX 20E but in other embodiments these components may be separate. Stored in a memory of the first UE 20 or embodied in hardware (or both software and hardware) at 20G are the rules for the UE to follow for the various temporary strategies it adopts for handling data-related transmissions in preparation for switching between the licensed and the license-exempt bands as detailed more fully above.

The other user device/second UE2 21 is similarly functional with components/functional blocks 21A, 21B, 21C, 21D, 21E, 21F, 21G and 21H.

The eNodeB 22 also includes processing means such as at least one data processor (DP) 22A, storing means such as at least one computer-readable memory (MEM) 22B storing at least one computer program (PROG) 22C, and communicating means such as a transmitter TX 22D and a receiver RX 22E for bidirectional wireless communications with its associated user devices 20, 21 via one or more antennas 22F and a modem 22H. The eNodeB 22 also has at functional block 22G the rules for the various temporary strategies it may instruct the UEs to adopt, as well as rules for deciding and tracking when to switch between the licensed and the license-exempt bands.

The MME/S-GW is similarly functional with components/functional blocks 24A, 24B, 24C, 24D, 24E and 24H. The MME/S-GW may not have an antenna or wireless capability.

At least one of the PROGs 20C, 21C, 22C in the UEs 20, 21 and in the eNodeB 22 is assumed to include program instructions that, when executed by the associated DP 20A, 21A, 22A, enable the device to operate in accordance with the exemplary embodiments of this invention as detailed more fully above. In this regard the exemplary embodiments of this invention may be implemented at least in part by computer software stored on the MEM 20B, 21B, 22B which is executable by the DP 20A, 21A, 22A of the respective first and second UEs 20, 21 and eNodeB 22, or by hardware, or by a combination of tangibly stored software and hardware (and tangibly stored firmware). Electronic devices implementing these aspects of the invention need not be the entire UE 20, 21 or eNodeB 22, but exemplary embodiments may be implemented by one or more components of same such as the above described tangibly stored software, hardware, firmware and DP, or a system on a chip SOC or an application specific integrated circuit ASIC or a digital signal processor DSP or a modem or a subscriber identity module commonly referred to as a SIM card.

Various embodiments of the UE 20, 21 can include, but are not limited to: cellular telephones; data cards, USB dongles, personal portable digital devices having wireless communication capabilities including but not limited to laptop/palmtop/tablet computers, digital cameras and music devices, and Internet appliances.

Various embodiments of the computer readable MEM 20B/21B/22B include any data storage technology type which is suitable to the local technical environment, including but not limited to semiconductor based memory devices, magnetic memory devices and systems, optical memory devices and systems, fixed memory, removable memory, disc memory, flash memory, DRAM, SRAM, EEPROM and the like. Various embodiments of the DP 20A/21A/22A include but are not limited to general purpose computers, special purpose computers, microprocessors, digital signal processors (DSPs) and multi-core processors.

Various modifications and adaptations to the foregoing exemplary embodiments of this invention may become apparent to those skilled in the relevant arts in view of the foregoing description. While the exemplary embodiments have been described above in the context of the WLAN and LTE systems, it should be appreciated that the exemplary embodiments of this invention are not limited for use with only this one particular type of wireless communication system, and that they may be used to advantage in other wireless communication systems such as for example UTRAN, WCDMA and others.

Some of the various features of the above non-limiting embodiments may be used to advantage without the corresponding use of other described features. The foregoing description should therefore be considered as merely illustrative of the principles, teachings and exemplary embodiments of this invention, and not in limitation thereof.

What is claimed is:

1. A method, comprising:
   adopting a temporary strategy for conducting device-to-device (D2D) transmissions prior to a switch between performing the D2D transmissions on a licensed frequency band and performing the D2D transmissions on a license-exempt frequency band in response to receiving a pre-switch notification indicating the temporary strategy, which is selected from among at least two strategy options, and a duration during which the temporary strategy shall be adopted; and
   discontinuing the temporary strategy after the switch.

2. The method according to claim 1, wherein the two strategy options are, for a case in which there is data to send during the indicated duration:
   a no-new-data option in which new data transmissions are suspended and data retransmissions are sent with high reliability; and
   a no-feedback option in which new data is sent with high reliability and data re-transmissions are suspended.

3. The method according to claim 2, wherein
   the high reliability comprises selecting a modulation and coding scheme for the sending that is lower than other available modulation and coding schemes;
   the no-new-data option further comprises continuing sending and receiving acknowledgements for any correctly received data re-transmissions; and
   the no-feedback option further comprises suspending sending and receiving acknowledgements for any correctly received new data transmissions.

4. The method according to claim 1, wherein
   the D2D transmissions are from a first user equipment executing the method to at least one second user equipment, and
   the method further comprises:
   receiving a switch command which comprises an allocation of radio resources; and
   switching the D2D transmissions from a one of the licensed or license-exempt frequency bands to the other of the licensed or license-exempt frequency bands based on the allocation of radio resources included in the received switch command.

5. The method according to claim 4, wherein
   the switch is from the licensed frequency band to the license-exempt frequency band, and
   the method further comprises the first user equipment contending for a channel on the license-exempt band and sending on the licensed band to a network access node an indicator that the first user equipment occupies the channel on the license-exempt band.

6. The method according to claim 4, wherein
   the switch is from the licensed frequency band to the license-exempt frequency band, and
   the allocation of radio resources is for a channel on the license-exempt band which was contended for by a network access node which sent the switch command.

7. An apparatus, comprising:
   circuitry configured to:
   adopt a temporary strategy for conducting device-to-device (D2D) transmissions prior to a switch between performing the D2D transmissions on a licensed frequency band and performing the D2D transmissions on a license-exempt frequency band in response to receiving a pre-switch notification indicating the temporary strategy, which is selected from among at least two strategy options, and a duration during which the temporary strategy shall be adopted; and
   discontinue the temporary strategy after the switch.

8. The apparatus according to claim 7, wherein the two strategy options are, for the case in which there is data to send during the indicated duration:

a no-new-data option in which new data transmissions are suspended and data re-transmissions are sent with high reliability; and a no-feedback option in which new data is sent with high reliability and data re-transmissions are suspended.

9. The apparatus according to claim 8, wherein
the high reliability comprises selecting a modulation and coding scheme for the sending that is lower than other available modulation and coding schemes;

the no-new-data option further comprises continuing sending and receiving acknowledgements for any correctly received data re-transmissions; and the no-feedback option further comprises suspending sending and receiving acknowledgements for any correctly received new data transmissions.

10. The apparatus according to claim 7, wherein
the D2D transmissions are from the apparatus which is a first user equipment to at least one second user equipment, and the circuitry is further arranged to:
receive a switch command which comprises an allocation of radio resources; and
switch the D2D transmissions from a one of the licensed or license-exempt frequency bands to the other of the licensed or license-exempt frequency bands based on the allocation of radio resources included in received switch command.

11. The apparatus according to claim 10, wherein
the switch is from the licensed frequency band to the license-exempt frequency band, and the circuitry is configured to cause the first user equipment to contend for a channel on the license-exempt band and send on the licensed band to a network access node an indicator that the first user equipment occupies the channel on the license-exempt band.

12. The apparatus according to claim 10, wherein
the switch is from the licensed frequency band to the license-exempt frequency band, and the allocation of radio resources is for a channel on the license-exempt band which was contended for by a network access node which sent the switch command.

13. An apparatus comprising:
circuitry configured to
receive a pre-switch notification indicating a switch between performing device-to-device (D2D) communication on a licensed frequency band and performing the D2D communication on a license exempt frequency band, wherein the pre-switch notification indicates a strategy, which is selected from among at least two strategy options, and a duration during which the strategy shall be adopted;
adopt the strategy for conducting the D2D communication prior to the switch; and
discontinue the strategy after the switch.

14. The apparatus of claim 13, wherein
the strategy is a no-new-data option in which new data transmissions are suspended and data retransmissions are performed using a modulation and coding scheme that is lower than other available modulation and coding schemes.

15. The apparatus of claim 13, wherein
the strategy is a no-feedback option in which new data is sent using a modulation and coding scheme that is lower than other available modulation and coding schemes and data re-transmissions are suspended.

16. The apparatus of claim 13, wherein
the apparatus is a user equipment configured to perform the D2D communication with another user equipment.

* * * * *